No. 12,249. REISSUED JULY 26, 1904.

O. P. OSTERGREN.

INTERNAL COMBUSTION ENGINE.

APPLICATION FILED APR. 15, 1904.

4 SHEETS—SHEET 1.

Witnesses:
C. F. Lennington
R. L. Hall

Inventor:
Oscar P. Ostergren
by Chapin, Hayford & Marble
his Attorneys.

No. 12,249. REISSUED JULY 26, 1904.

O. P. OSTERGREN.

INTERNAL COMBUSTION ENGINE.

APPLICATION FILED APR. 15, 1904.

4 SHEETS—SHEET 2.

Witnesses:
C. F. Cannington
C. L. Hall

Inventor:
Oscar P. Ostergren
by Chapin, Hayward & Marble
his attorneys.

No. 12,249. REISSUED JULY 26, 1904.

O. P. OSTERGREN.

INTERNAL COMBUSTION ENGINE.

APPLICATION FILED APR. 15, 1904.

4 SHEETS—SHEET 3.

Witnesses:
C. F. Cannington
R. L. Steel

Inventor:
Oscar P. Ostergren
by Chapin Stannard & Martin
his attorneys.

No. 12,249. REISSUED JULY 26, 1904.

O. P. OSTERGREN.

INTERNAL COMBUSTION ENGINE.

APPLICATION FILED APR. 15, 1904.

4 SHEETS—SHEET 4.

Witnesses:
C. F. Carrington
C. L. Hall

Inventor:
Oscar P. Ostergren
by Chapin Maxwell & Marble
his attorneys.

No. 12,249. Reissued July 26, 1904.

UNITED STATES PATENT OFFICE.

OSCAR P. OSTERGREN, OF NEW YORK, N. Y., ASSIGNOR, BY MESNE ASSIGNMENTS, TO THE FUEL OIL POWER COMPANY, A CORPORATION OF THE DISTRICT OF COLUMBIA.

INTERNAL-COMBUSTION ENGINE.

SPECIFICATION forming part of Reissued Letters Patent No. 12,249, dated July 26, 1904.

Original No. 752,410, dated February 16, 1904. Application for reissue filed April 15, 1904. Serial No. 203,896.

*To all whom it may concern:*

Be it known that I, OSCAR P. OSTERGREN, a subject of the King of Sweden and Norway, and a resident of New York city, county, and State, have invented certain new and useful Improvements in Internal-Combustion Engines, of which the following is a specification, reference being had to the accompanying drawings, forming a part thereof.

My invention relates to improvements in internal-combustion engines, and particularly to that class of internal-combustion engines operating upon the two-cycle principle.

My invention consists particularly in a novel form and construction of admission-valve for the introduction of fuel into the cylinder and in novel and improved means for operating same, in an improved construction and means whereby resistance to the admission of fuel into the cylinder by the pressure of compressed fluid therein may be opposed by the introduction of such compressed fluid at the rear as well as at the front of the valve-face, in a novel form of combined compressor and suction feed-pump for the fuel, and in novel means for automatically timing the operation of the fuel-admission valve correctly for either direction of rotation of the engine.

My invention further consists in certain novel details of construction and combination of parts, as will be hereinafter more fully set forth.

I will now proceed to describe an internal-combustion engine embodying my invention and will then point out the novel features in claims.

Figure 1:
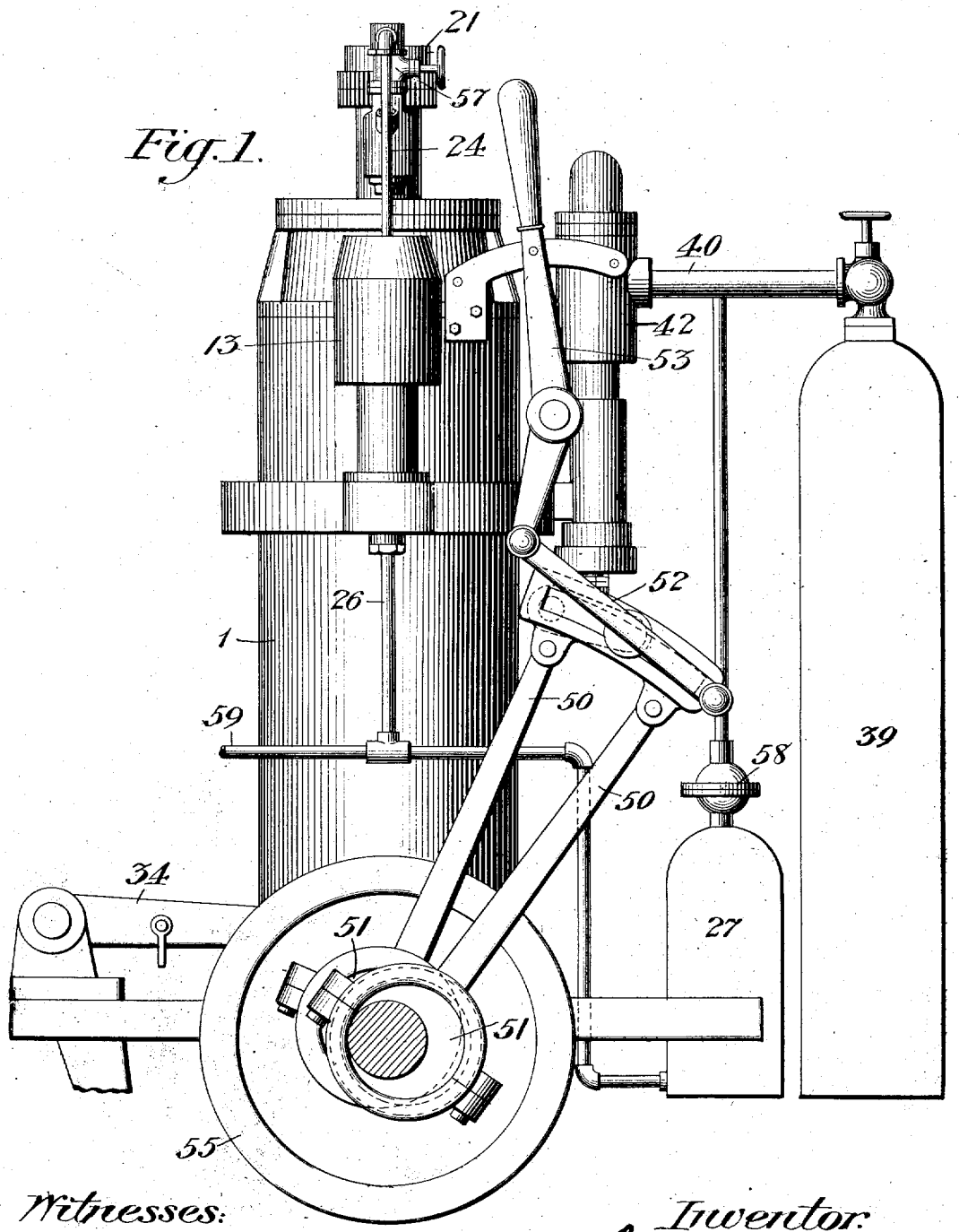
Figure 2:
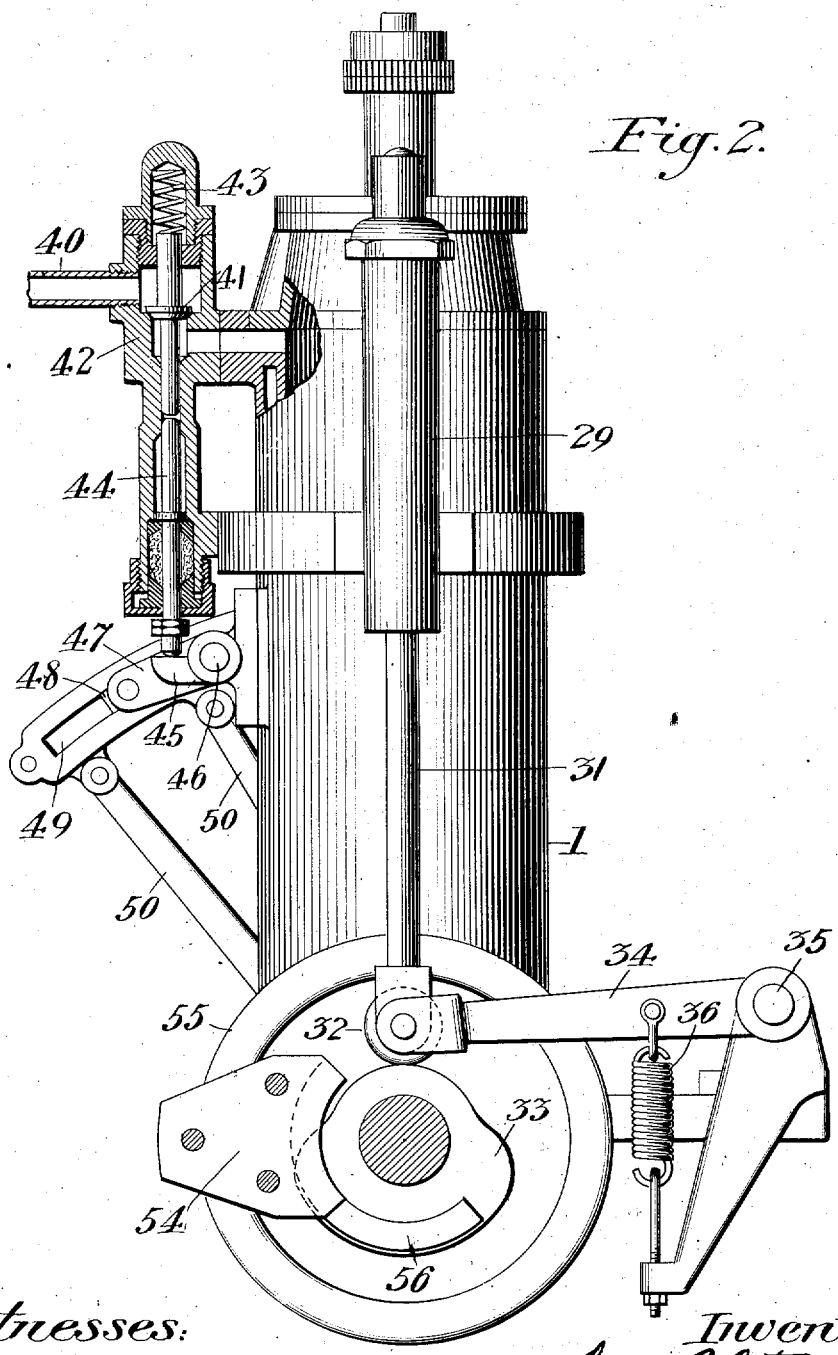
Figure 3:
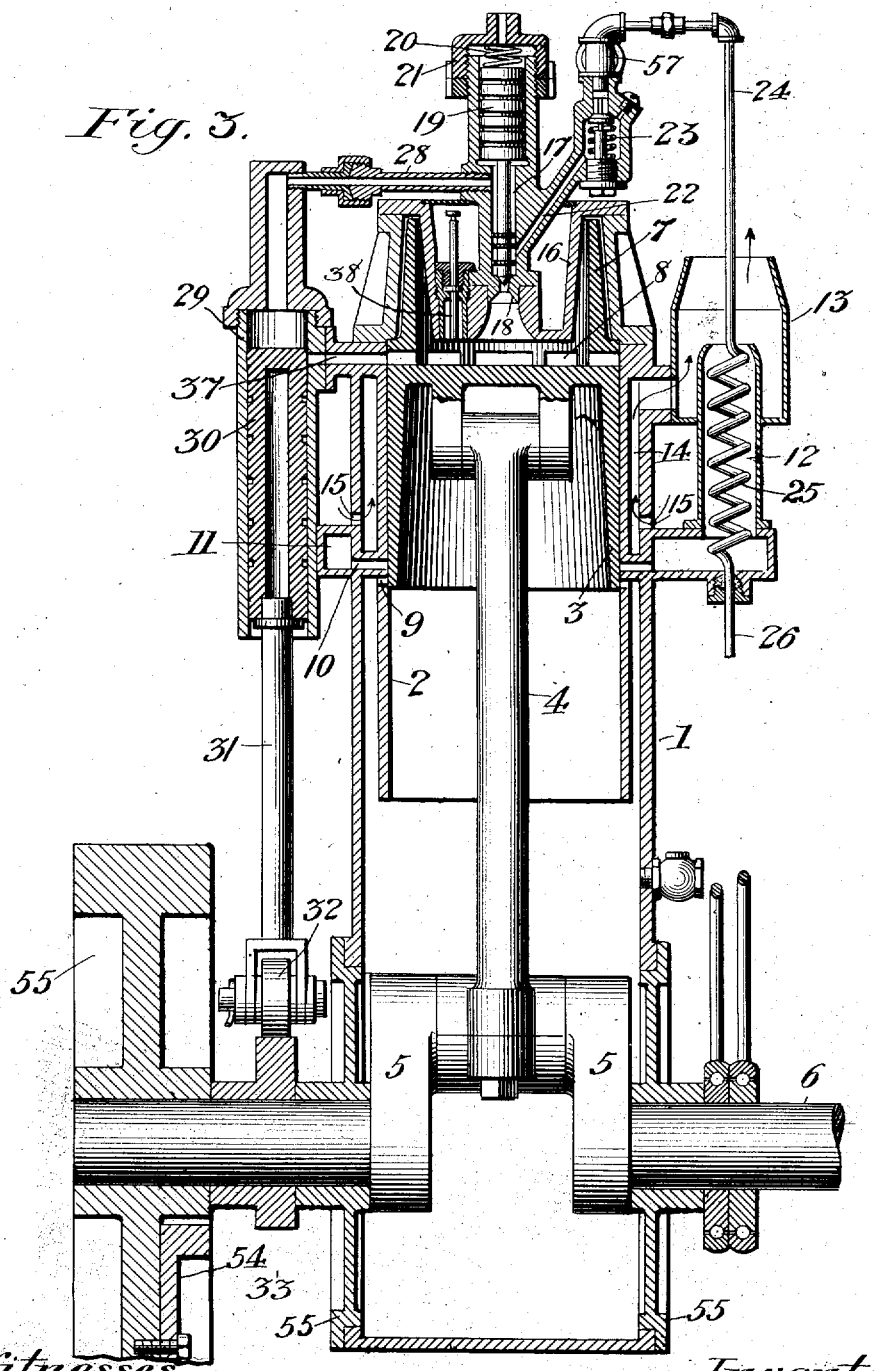
Figure 4:
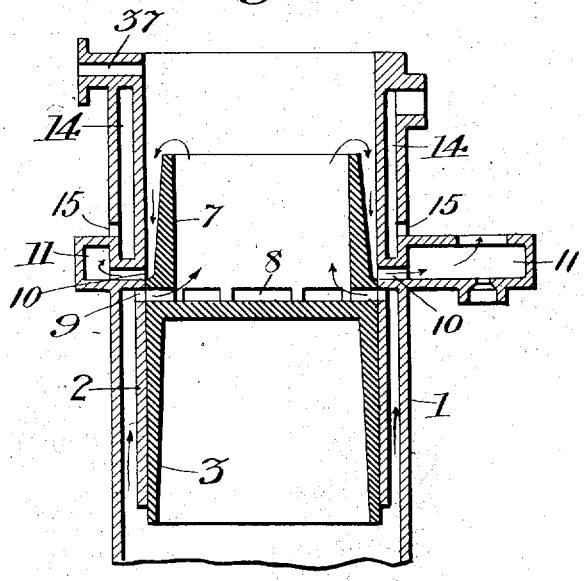

In the drawings, Figure 1 is a view in side elevation of a gas-engine embodying my invention. Fig. 2 is a view, partly in side elevation and partly in central longitudinal section, of the same, illustrating the opposite side to that shown in Fig. 1. Fig. 3 is a view in central vertical section of the same, the plane of section being taken at right angles to the views shown in Figs. 1 and 2. Fig. 4 is a diagrammatic view illustrating the piston at the lower end of its stroke and the incoming compressed air passing into the deflector and driving the products of combustion out of the deflector through the exhaust.

In the present embodiment of my invention I provide a casing 1, which entirely incloses the crank and connecting-rod. Within the casing or constructed as a part thereof I provide a cylinder 2, between which and the casing I leave an annular chamber, through which a cooling medium may be permitted to circulate. Fitted to the cylinder 2 is a trunk-piston 3, connected by an ordinary connecting-rod or pitman 4 to a crank 5, arranged upon the engine-shaft 6. The engine-shaft is supported in suitable journal-boxes in portions of the casing 1.

The piston 3 is provided at its upper or rear end with an annular deflector 7, secured thereto or formed as an integral part thereof, and the piston is further provided with ports 8 for admitting compressed air to within the deflector 7. The cylinder 2 is provided circumferentially with inlet-ports 9 and exhaust-ports 10. The inlet-ports 9 communicate with the interior of the casing 1. The exhaust-ports 10 communicate with an annular chamber 11, arranged around the casing 1, and from thence pass into a nozzle 12, forming a part of an ejector. The outer nozzle of the ejector is shown at 13 and connects with the annular space 14 between the upper end of the cylinder 2 and the outer wall of the casing 1. The walls of the ports 12 constitute an inclosing end for the space 14, and inlet-ports 15 admit cooling medium to the said space.

The rear end of the cylinder is provided with a reëntrant portion or head, between which and the outer walls of the cylinder the deflector 7 of the piston is adapted to be inclosed when at the upper end of its stroke. The head 16 supports a fuel-admission valve comprising casing 17, a valve-plug 18, a piston 19, a spring 20, and an inclosing cap or cover 21. The valve-casing 17 is in communication, through a channel 22, check-valve 23, pipe 24, heating-coil 25, (arranged within the nozzle 12 of the ejector,) and pipe 26, with a source of fuel-supply under pressure 27. The valve-casing 17 is further in communication, through pipe 28, with the upper end of an auxiliary compressor 29. The compressor 29 includes a compressing-piston 30, connected, by a piston-rod 31 and a cam-follower 32, with an operating-cam 33, mounted upon the main shaft 6. A link 34, pivoted at 35 to a stationary portion of the engine, connects with the connecting-rod 31 and acts as a guide to guide same in its movement, while a spring 36, connected to the said link and to a stationary portion of the engine, operates to hold the cam-follower 32 always in contact with the face of the cam 33. The auxiliary compressor has also a connection 37 with the upper end of the cylinder 2. A suitable electric starting-plug 38 is mounted in the end or head of the cylinder or may be located elsewhere in any other convenient position.

The reservoir 27 is arranged to carry liquid fuel under pressure, such as a heavy oil, and the oil is thus constantly supplied through the pipe 26, heater 25, pipe 24, needle-valve 57, and check-valve 23 to the fuel-admission valve 18. When the auxiliary-compressor piston 30 is below the level of the port 37, fluid-pressure is equalized through the rear end of the cylinder, port 37, auxiliary-compressor cylinder 29, and pipe 28 upon both sides of the fuel-admission valve 18, and the action of the spring 20 will be such as to hold the valve to its seat. If the auxiliary-compressor piston 30 be raised, however, to a point above the port 37, as it will be so raised at the proper time by the cam 33, the said port will be closed, and the fluid above the moving piston 30 will be compressed until the pressure thereof, rising to a point above the resistance of the spring 20, will slightly lift the piston 19 and permit oil to feed through the valve 18 into the rear end of the cylinder 2 behind the piston 3. Such admission will continue to take place for so long a time as the valve 18 is held open.

When the piston 3 is at the upper end of its stroke, as shown in Fig. 3 of the drawings, the admission-ports 9 for compressed air will be closed, as will also the exhaust-ports 10. When the piston is moved down to approximately the lowest or inmost end of its stroke, as shown in diagrammatic Fig. 4, exhaust-ports 10 will be uncovered by the piston, and the admission-ports 9 of the cylinder 2 will be substantially in register with the ports 8 of the piston, and air from within the crank-casing 1, which has been slightly compressed by the downwardly-moving piston 3, will be admitted through the ports 9 and the ports 8 to within the deflector 7 of the piston. The incoming compressed air will drive the dead products of combustion from within the deflector 7 up and around same till they are finally discharged through the exhaust-ports 10. The hot burned gases will pass out through chamber 11 and nozzle 12, heating the incoming oil by impingement upon the heating-coil 25 within the nozzle 12, and will finally be discharged through the mouth of the nozzle 12 and that of the nozzle 13, inducing a current of cold air through the annular chamber 14 and the nozzle 13. Fresh incoming air will be taken in through ports 15 and will act as a cooling medium upon the cylinder 2.

In its first upward movement the piston 3 will quickly close the admission-ports 9 and the exhaust-ports 10 and will then in its further upward movement compress the charge of fresh air within the rear end of the cylinder and within the deflector of the piston. This air will be compressed to a point that after the engine has been running a short time and taken in conjunction with the heating of the cylinder end or head will be sufficient to secure ignition of the oil sprayed into the cylinder through the valve 18. The oil is sprayed into the cylinder just as the piston reaches the end of the compression-stroke and immediately ignites. Ignition having been thus secured at substantially the completion of the rear or upper stroke of the piston and such ignition taking place in an inclosed space containing oil in a finely-subdivided condition and air under pressure, energy will be developed to drive the piston forward. The foregoing cycle of operations will then be continued indefinitely.

The speed of the engine may be regulated by the adjustment of a needle-valve 57, arranged in the pipe 24, by the adjustment of which a larger or smaller quantity of fuel will be permitted to feed into the upper end of the cylinder in a given time.

As before stated, the fuel will be under pressure in the reservoir 27, and such pressure may conveniently be obtained by connecting the reservoir with a source of fluid-pressure within another reservoir 39, presently to be described. A reducing-valve 58 will preferably be employed in the connection between the two reservoirs, so that uniform pressure may be maintained within the reservoir 27 regardless of the pressure within the reservoir 39, the pressure in the reservoir 39 being always greater than that required in the reservoir 27.

The pressure required in the reservoir 27 need be sufficient merely to raise the oil up and through the pipe 26 to feed-port 22 and to overcome the resistance of the spring of the check-valve 23. The oil in the passage 22 has no need of being under high pressure, because of the fact that at the moment the oil is feeding into the cylinder through the port 18 the pressure behind the valve in the valve-casing 17 will be slightly greater than the pressure within the rear end of the cylinder 2, into which the oil is feeding. The auxiliary compressor 29 acts somewhat in the nature of a feed-pump to feed the oil into the cylinder, as well as a compressor to provide fluid-pressure beneath the piston 19 to lift the valve 18.

If desired, the compressor piston and cylinder may act also as a suction-pump, in which case the suction of the said piston in its downward movement will raise the oil up and through the fuel-supply pipe 26 and overcome the resistance of the check-valve 23. In this case the oil in the reservoir may be at atmospheric pressure.

In referring to the balance of pressure above and beneath the valve 18 when the compressing-piston 30 is beneath the port 37 it will be understood, of course, that while the pressure on the opposite sides of the valve 18 is the same such pressure acting upon the under side of the piston 19 will always exert a force tending to lift the valve; but such force will normally be overcome by the spring 20 until the pressure is raised to a point sufficient to overcome the resistance of the spring.

The fuel-reservoir 27 may be charged through a pipe 59, forming a branch of the pipe 26, which may connect with an oil-pump or other source of supply in any well-known manner.

By the foregoing it will be seen that I do not attempt to water-jacket my cylinder, as is usual in internal-combustion engines, but merely cool same by constantly inducing a current of fresh air around the cylinder, it being remembered that the forward end of the cylinder is constantly in the presence of practically fresh cool air in the crank-casing 1. I do not attempt to jacket the rear or outer end of the cylinder, because I desire to use the heat of same for the purpose of insuring ignition at each stroke. I provide an ignition-plug 38 to be employed when first starting the engine up; but after the engine has been running a short time the use of such plug is not necessary.

Because of the peculiar form of the deflector and the manner of introducing air within same from the crank-chamber a whirling action is produced, which very effectively scavenges the cylinder, driving therefrom substantially all of the burned gases before the exhaust-ports are closed by the upwardly-moving piston.

For the purpose of starting the engine I have provided a reservoir 39, arranged to contain a supply of fluid under pressure, which communicates through a pipe 40 with a combined inlet and check valve 41, arranged in a casing 42 upon the side of the crank-casing 1. The valve 41 has an upper stem, and a spring 43 is arranged between the upper end of the casing and the end of the said stem to constantly bear against the same to hold the valve closed. The said valve is also provided with a lower stem adapted to be engaged by a sliding plunger 44, mounted in an extension of the casing 42 and passing through a suitable stuffing-box to the external atmosphere. A tappet 45, secured upon a short rock-shaft 46, engages the plunger 44 and under certain conditions causes a reciprocation of the same. The rock-shaft 46 has also secured thereto an arm or lever 47, the outer end of which carries a block 48, mounted in a quadrant 49. The quadrant 49 forms a part of a Stevenson link-motion comprised in connecting-rods 50, eccentrics 51, a link 52, and an operating-lever 53. In the position shown in the drawings the operating-lever 53 is in its intermediate position, and the block 48 is at a point midway of the quadrant 49. This is a position of practical rest or dead-center, and operation of the eccentrics will have no practical effect upon the arm or lever 47, and the rock-shaft 46 will hence remain at rest. When it is desired to start the engine, the operating-lever 53 is thrown in one direction or the other, according to in which direction it is desired that the engine shall run. When so operated, one or other of the eccentrics 51 will operate to vibrate the arm 47, rock-shaft 46, and hence tappet 45, to cause a reciprocation of the plunger 44. Reciprocation of the plunger 44 will open the valve 41 at a predetermined point in the position of the moving parts of the engine and for a predetermined period, so as to admit compressed motive fluid from within the reservoir 39 as a working fluid for the engine. For a short time the engine will be operated by motive fluid from the reservoir 39, just in the same manner as an ordinary single-acting steam or air engine is operated, until after several strokes have been made and air compressed in the cylinder and fuel admitted the engine will commence to work as an internal-combustion engine, when the operating-lever 53 may be again operated to bring the link-motion to a dead-center, and admission from the reservoir 39 will cease. At each subsequent working stroke of the engine for a short period compressed fluid will be supplied to the reservoir 39 to take the place of that which has been employed for starting the engine, the valve 41 at such times opening freely toward the reservoir and operating as a check-valve to prevent return of fluid therefrom.

As before explained, in order to start the engine in one direction or the other it is merely necessary to throw the operating-lever of the link-motion to the right or left, so as to operate the valve 41 at the proper time. When reversing the engine, however, it is necessary to operate the auxiliary compressor 29 with respect to the crank-shaft upon the opposite side of a line passing through the center of the engine. For the purpose of automatically making the necessary change of position of the cam 33 with respect to the shaft 6 when the direction of rotation of the engine is reversed I have mounted the said cam 33 loosely upon the shaft and have provided an abutment 54 upon the fly-wheel 55, which abutment is adapted to engage a projection 56 upon the cam 33 to compel its rotation, but which abutment will pass through an arc of one hundred and eighty degrees before again engaging with the said projection, when the direction of rotation of the engine is reversed. (See particularly Fig. 2.)

By the foregoing it will be seen that I am enabled to start and run my engine in either direction at will by the simple manipulation of a link-motion-operating lever.

When the engine is first started, it may be necessary for a short space of time to use the electric igniting-plug 38; but after the engine has been running but a short time the current thereto may be discontinued, as the heating of the cylinder end 16, together with the compression of air within the cylinder end when the piston has completed its rear stroke, will give a temperature sufficient to ignite the fuel-supply, and the engine will continue to run without further ignition from external sources. The check-valve 23 is provided in order to prevent backing up of motive fluid into the oil-supply pipe 24.

While for simplicity I have shown only one cylinder and the valve-gear pertaining thereto, it will be understood that in order that the engine may be self-starting and self-reversing under all conditions it is necessary to have a plurality of cylinders connected to the same crank-shaft, the starting and reversing valve motions of which may be operated from the same lever.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise details of construction and combination of parts; but

What I claim is—

1. In an internal-combustion engine, the combination with a working cylinder and a piston, of an engine-driven air-pump and a fuel-valve including means for opening the same, directly exposed to and actuated by the pressure from the pump, whereby the operation of the valve is pneumatically timed in relation to the engine speed.

2. In an internal-combustion engine, the combination with a working cylinder and a piston therein, of a fuel-admission valve, pressure-operated means connected thereto and adapted, when operated, to open said valve, and an air-pump operated by the engine for supplying pneumatic pressure to the pressure-operated means for operating same, the connection from the pump to the pressure-operated means being direct and open in a direction toward the pressure-operated means at all times.

3. In an internal-combustion engine, the combination with a cylinder and a piston therein, of a fuel-admission valve communicating with the interior of the cylinder, a passage leading from within the cylinder, at its working end, to behind the valve, pressure-operated means for operating the valve in one direction, and means operated by the engine in its movement for closing the said passage and for compressing fluid to operate the said fluid-pressure-operated means.

4. In an internal-combustion engine, the combination with a cylinder and piston therein, of a fuel-admission valve, a passage leading from within the cylinder to the rear of the said valve, pressure-operated means connecting with said passage, for operating said valve in one direction, an auxiliary compressor adapted in its movement to close the said passage and compress the fluid remaining therein on the rear side of the valve, and means for operating the auxiliary compressor.

5. In an internal-combustion engine, the combination with a cylinder and piston therein, of a fuel-admission valve, a passage leading from within the cylinder to the rear of the said valve, pressure-operated means for operating said valve in one direction, an auxiliary compressor adapted in its movement to close the said passage and compress the fluid remaining therein on the rear side of the valve and to actuate the pressure-operated means, and means connected with a moving part of the engine to operate the auxiliary compressor, said means adjustable with respect to the movement of the engine.

6. In an internal-combustion engine, the combination with a cylinder and piston therein, of a fuel-admission valve, a passage leading from within the cylinder to the rear of the said valve, pressure-operated means for operating said valve in one direction an auxiliary compressor adapted in its movement to close the said passage and compress the fluid remaining therein on the rear side of the valve and to actuate the pressure-operated means, a cam connected with the engine for operating the auxiliary compressor and means for adjusting the position of the cam with relation to the movement of the engine.

7. In an internal-combustion engine, the combination with a cylinder and a piston therein, of a fuel-admission valve communicating with the interior of the cylinder, a passage leading from within the cylinder to behind the valve, means for operating the valve, and means for producing a preponderance of pressure behind the valve when same is opened whereby fuel may be fed thereto at low pressure.

8. In an internal-combustion engine, the combination with a cylinder and a piston therein, of a fuel-admission valve communicating with the interior of the cylinder, a passage leading from within the cylinder to behind the valve, means for operating the valve and means for closing the said passage and raising the pressure behind the valve when the same is opened.

9. In an internal-combustion engine, the combination with a cylinder and a piston therein, of a fuel-admission valve communicating with the interior of the cylinder, means for admitting fluid under pressure from within the working end of the cylinder to behind the valve-face, while said valve is closed, and means for operating the valve to admit fuel to the working end of the cylinder.

10. In an internal-combustion engine, the combination with a cylinder and a piston therein, of a fuel-admission valve communicating with the interior of the cylinder, means for admitting fluid under pressure from within the cylinder to behind the valve-face, while said valve is closed, and means for increasing the pressure behind the valve-face as the valve opens, in order to feed fuel into the cylinder, against the pressure of the fluid therein.

11. In an internal-combustion engine, the combination with a cylinder and a piston therein, of a fuel-admission valve communicating with the interior of the cylinder, a check-valve, means for admitting fluid under pressure from within the working end of the cylinder to between the admission-valve and the check-valve while the admission-valve is closed, and means for operating the admission-valve to admit fuel to the working end of the cylinder.

12. In an internal-combustion engine, the combination with a cylinder and a piston therein, of a fuel-admission valve communicating with the interior of the cylinder, a check-valve, means for admitting the fluid under pressure within the cylinder to between the admission-valve and the check-valve while the admission-valve is closed, and means for increasing the pressure between the two valves as the admission-valve opens, in order to feed fuel into the cylinder, against the pressure of the fluid therein.

13. In an internal-combustion engine, the combination with a cylinder and a piston therein, of a fuel-admission valve communicating with the interior of the cylinder, a source of fuel-supply, a check-valve therein, a passage leading from the interior of the cylinder to a point in the fuel-supply between the check-valve and the admission-valve, and means for closing the passage to the cylinder, and for raising the pressure in that portion of the passage connecting between the said valves.

14. In an internal-combustion engine, the combination with a cylinder and a piston therein, of a fuel-feed pump, and means for admitting fuel and fluid under pressure from the working end of the cylinder, to the feed-pump.

15. In an internal-combustion engine, the combination with a cylinder and a piston therein, of a fuel-feed pump, and means for admitting fuel, and fluid under pressure from the working end of the cylinder to the feed-pump once for each working stroke of the engine.

16. In an internal-combustion engine, the combination with a cylinder and a piston therein, said piston in its operation arranged to compress air within said cylinder, of a fuel-feed pump arranged to admit fuel into the volume of air so compressed, and contained within the said cylinder, and means for admitting air, so compressed, from the cylinder to the feed-pump, prior to its said fuel-admitting operation.

In testimony whereof I hereunto affix my signature in the presence of two witnesses.

OSCAR P. OSTERGREN.

Witnesses:
D. HOWARD HAYWOOD,
C. F. CARRINGTON.